United States Patent
Myers (10) Patent No.: US 9,298,022 B2
(45) Date of Patent: Mar. 29, 2016

(54) EYEWEAR WASHING MACHINE AND METHOD

(75) Inventor: Bryan K. Myers, Ocala, FL (US)

(73) Assignee: SHADE SAVER, INC., Ocala, FL (US)

( * ) Notice: Subject to any disclaimer, the term of this patent is extended or adjusted under 35 U.S.C. 154(b) by 1032 days.

(21) Appl. No.: 13/437,238

(22) Filed: Apr. 2, 2012

(65) Prior Publication Data

US 2012/0247517 A1   Oct. 4, 2012

Related U.S. Application Data

(60) Provisional application No. 61/469,857, filed on Mar. 31, 2011.

(51) Int. Cl.
*G02C 13/00* (2006.01)
*B08B 3/02* (2006.01)

(52) U.S. Cl.
CPC .............. *G02C 13/006* (2013.01); *B08B 3/022* (2013.01); *G02C 13/00* (2013.01)

(58) Field of Classification Search
CPC .......... G02C 13/006; G02C 3/04; G04D 3/08; A47G 29/08; G07F 17/20
See application file for complete search history.

(56) References Cited

U.S. PATENT DOCUMENTS

| | | | |
|---|---|---|---|
| 1,292,407 A | | 1/1919 | Spicer |
| 3,259,139 A | | 7/1966 | Bell |
| 3,480,022 A | | 11/1969 | Richardson |
| 3,552,701 A | * | 1/1971 | Montagano ............... B60R 1/12 211/85.1 |
| 4,034,432 A | | 7/1977 | Sullivan |
| 4,112,955 A | * | 9/1978 | Gollel ..................... G07F 17/20 134/143 |
| 4,128,224 A | * | 12/1978 | Guichard ................ A47F 7/021 248/305 |
| 4,157,097 A | | 6/1979 | Miya |
| 4,196,487 A | | 4/1980 | Merriman |
| 5,085,388 A | * | 2/1992 | Creutz .................... A47F 7/021 248/206.5 |
| 5,143,101 A | * | 9/1992 | Mor ..................... G02C 13/006 134/108 |
| 5,335,394 A | | 8/1994 | Cunningham, Jr. et al. |
| 5,794,635 A | | 8/1998 | Maines |

(Continued)

FOREIGN PATENT DOCUMENTS

| | | | | |
|---|---|---|---|---|
| DE | 101 54 161 A1 | | 5/2003 | |
| DE | 10154161 A1 | * | 5/2003 | ........... G02C 13/006 |

(Continued)

OTHER PUBLICATIONS

English Machine Translation of DE 10154161A1.*

(Continued)

*Primary Examiner* — Nicole Blan
(74) *Attorney, Agent, or Firm* — Oliff PLC (57) ABSTRACT

A machine is presented for the cleaning of eyewear. The machine allows the manual or automatic cleaning of eyewear. Under both modes of operation, the eyewear is secured by a user to a support bracket inside a transparent, water-tight cylindrical wash chamber. When in manual mode, the user can direct the spray of wash fluid onto the eyewear by rotating the eyewear using a trackball. When used in automatic mode, the machine washes the eyewear during a preset washing cycle. For both modes, the washing cycle is followed by the drying cycle where a blower directs air onto the lenses for a set time period to blow off excess moisture. The drying cycle concludes with a blower venting the cylindrical wash chamber to remove residual moisture from the wash chamber and the eyewear. After the cleaning, the user removes the eyewear from the machine.

21 Claims, 6 Drawing Sheets

(56) References Cited

U.S. PATENT DOCUMENTS

| | | | |
|---|---|---|---|
| 6,338,350 B1 | | 1/2002 | Ewen |
| 6,415,803 B1 * | | 7/2002 | Sundin ................ B08B 3/00 134/108 |
| 6,539,957 B1 | | 4/2003 | Morales, Jr. |
| 6,578,589 B1 * | | 6/2003 | Mayusumi ........ H01L 21/67034 134/61 |
| 2003/0040352 A1 * | | 2/2003 | Marks ................. G07F 17/3293 463/13 |
| 2003/0136429 A1 * | | 7/2003 | Scranton ................. B08B 3/08 134/30 |
| 2003/0201004 A1 | | 10/2003 | Cooley |
| 2004/0244106 A1 * | | 12/2004 | Chesters ................ A61H 35/02 4/620 |
| 2008/0289971 A1 * | | 11/2008 | Shigihara ................ A61L 2/025 205/687 |

FOREIGN PATENT DOCUMENTS

| | | | | |
|---|---|---|---|---|
| GR | WO 2009138807 A1 * | 11/2009 | | ............... B08B 1/04 |
| JP | S59-118305 U | 8/1984 | | |
| JP | S60-76554 U | 5/1985 | | |
| JP | H10-3062 A | 1/1998 | | |
| JP | H11-128777 A | 5/1999 | | |
| JP | H11-333498 A | 12/1999 | | |
| JP | 2005-173452 A | 6/2005 | | |
| JP | 2005173452 A | * | 6/2005 | |
| WO | WO 94/22041 | 9/1994 | | |

OTHER PUBLICATIONS

English Machine Translation of JP 2005-173452 A.*
Jul. 9, 2014 First Office Action issued in Chinese Patent Application No. 201280017106.1 w/English-language Translation.
May 29, 2012 Written Opinion of the International Search Authority and International Search Report issued in PCT/US2012/031818.
Apr. 28, 2015 Office Action issued in Japanese Application No. 2014-502903.
European Patent Office, Written Opinion dated Nov. 8, 2013 in European Patent Application No. 12714470.7.
Dec. 15, 2014 Second Office Action issued in Chinese Application No. 201280017106.1.
Apr. 13, 2015 Notification to Grant Patent Right for Invention issued in Chinese Application No. 201280017106.1.
Oct. 30, 2015 Office Action issued in U.S. Appl. No. 13/840,232.

* cited by examiner

EYEWEAR WASHING MACHINE AND METHOD

CROSS REFERENCE TO RELATED APPLICATION

This nonprovisional utility patent application claims the benefit of Provisional Application No. 61/469,857 pursuant to 35 U.S.C. §119(e) which was filed on Mar. 31, 2011. The entire disclosure of the provisional application is hereby incorporated by reference in its entirety.

BACKGROUND

1. Field of Invention

The invention relates to devices and methods for cleaning eyewear.

2. Related Art

Lenses and frames of eyewear gather dust, fingerprints, sweat, and other foreign substances through daily wearing activities. Known eyeglass cleaning devices are described in U.S. Pat. No. 5,143,101 issued to Avi Mor on Sep. 1, 1992, U.S. Pat. No. 6,338,350 issued to Paul Ewen on Jan. 15, 2002, and U.S. Pat. No. 7,412,980 issued to Jean Gehrig et al. on Aug. 19, 2008.

U.S. Pat. No. 5,143,101 discloses a compact portable lens washing apparatus including a wash chamber, a reservoir for holding wash fluid, a pair of spaced nozzles facing each other, a lens support for holding a lens between the nozzles, a pump for squirting wash fluid through the nozzles onto the lens, a heater for heating the wash fluid, mechanism for maintaining a wash fluid vapor atmosphere in the wash chamber after the pump shuts off, and electronic elements for controlling the operation of the apparatus. Also disclosed is a method for washing a lens that includes the steps of impinging the lens surfaces with an organic volatile wash fluid during a wash cycle, shutting of the flow of wash fluid, allowing residual wash fluid to be drawn of the lens edge by fibers or filaments, and drying the lens in the presence of a wash fluid vapor atmosphere.

U.S. Pat. No. 6,338,350 discloses a portable device for cleaning eyeglasses. A transparent enclosure is provided having an upper chamber for cleaning the eyeglasses, a lower left chamber which may be removable for containing the cleaning solution and a lower right chamber housing a pump which is powered by batteries and controlled by a microprocessor. The pump circulates cleaning solution through a plurality of apertures in the floor of the upper chamber which creates a spray on the eyeglasses. A fan with a heating coil then circulates warm air over the eyeglasses in order to dry them.

U.S. Pat. No. 7,412,980 discloses a washing machine for glass lenses or other similar items of the type including a conveyor which has a bearing surface for moving the lenses through a washing chamber made of a succession of washing means. The traction force transmitted by the aforementioned bearing surface is carried out by two chains with endless links, located on the both sides of the aforementioned bearing surface, each chain being joined at the longitudinal side corresponding to the aforementioned bearing surface and is stretched tight between two driving gears, of axis parallel to the plane of the aforementioned bearing surface and perpendicular to the direction of displacement.

SUMMARY

The accumulation of dust, fingerprints, sweat, and other foreign substances, which impairs vision, is a problem when those who use eyewear are in locations where foreign substances such as sand grains, dust, and oils are commonly present. The manual effort of wiping lenses with a clean cloth is often unavailable or ineffective and can especially damage the lenses of the eyewear when foreign substances, such as sand grains, are wiped across them. The exemplary embodiments of the present invention have a dual purpose of utility and entertainment.

Regarding utility, embodiments permit a user to direct cleaning solution to user-selected portions of the glasses so that cleaning solution can be focused on the portions of the lenses and/or frames that requiring washing. Thus, exemplary embodiments of the invention provide an eyewear washing machine utilizing nozzles that will direct a wash fluid, under pressure, onto the front and back of the lenses and onto the frames of the eyewear for a preset time period. The eyewear will be secured in place by the user to a support bracket near the center of the machine. The orientation of the support bracket may be user-controlled. The washing cycle will be followed by a drying cycle that will direct a stream of air onto the eyewear utilizing piping and a diffuser connected to a blower.

Regarding entertainment, the embodiments permit manual cleaning option in a game-like, entertaining format. Additional advantages and novel aspects of embodiments of the invention will be apparent from the following disclosure. Exemplary embodiments of the invention provide for entertaining a user by enabling the user to manually direct the wash fluid onto the lenses or frames of the eyewear by using a trackball to rotate the support bracket and the attached eyewear during the washing cycle.

The aforementioned known glasses cleaning devices do not allow for a manual cleaning option in a game-like, entertaining format, as hereinafter described, or allow the user to focus the wash fluid on the eyewear at the point where there is greatest need. Further, known devices are limited in that they are designed for personal, rather than public, use. None of these known devices are available in a public readily accessible format and provide for the ability to clean the lenses as well as the frames of the eyewear in a focused manner.

Exemplary embodiments of the invention provide a display cabinet that houses a transparent cylindrical wash chamber, the nozzles used for spraying the wash fluid on the lenses and frames of the eyewear during the washing cycle, a portion of the tubing used to transport the wash fluid from a reservoir through a pump to the nozzles during the washing cycle, a portion of the piping used to transport air from a blower to the eyewear during the drying cycle, two vent fans, and the support bracket where the eyewear will be secured during the cleaning process.

According to exemplary embodiments of the invention, if the user desires to self-clean the eyewear, in the manual mode of operation, the user can utilize a trackball to rotate the support means so that the spray of wash fluid will come into contact with the attached eyewear at locations selected by the user. In addition, the base cabinet will house a computer, wash fluid return assembly, wash fluid reservoir, a pump, tubing to transport the wash fluid to the nozzles in the display cabinet, a blower, a portion of piping to transport air from the blower to the diffuser in the display cabinet, and a motor to raise and lower the cylindrical wash chamber to seal within the display cabinet during operation.

In exemplary embodiments, the wash fluid is filtered water, preferably through reverse osmosis or deionization filtration methods. Also, in exemplary embodiments, the wash fluid quality detector measures the concentration of total dissolved solids in the wash fluid. Other detectors and parameters may be used for monitoring depending on the wash fluid quality which will largely be dependent upon the environment in which the machine is used. Other types of wash fluid may be employed as well.

In exemplary embodiments, wash fluid is stored in a reservoir beneath the display cabinet. A pump sprays wash fluid onto the eyewear, and used wash fluid is recovered, filtered and reused resulting in a self contained operation. Periodically, wash fluid is replaced to ensure continued wash quality. A computer controller will be used for controlling the process, recording pertinent data and providing service notifications when needed.

DESCRIPTION OF EXEMPLARY EMBODIMENTS

Figure 1:
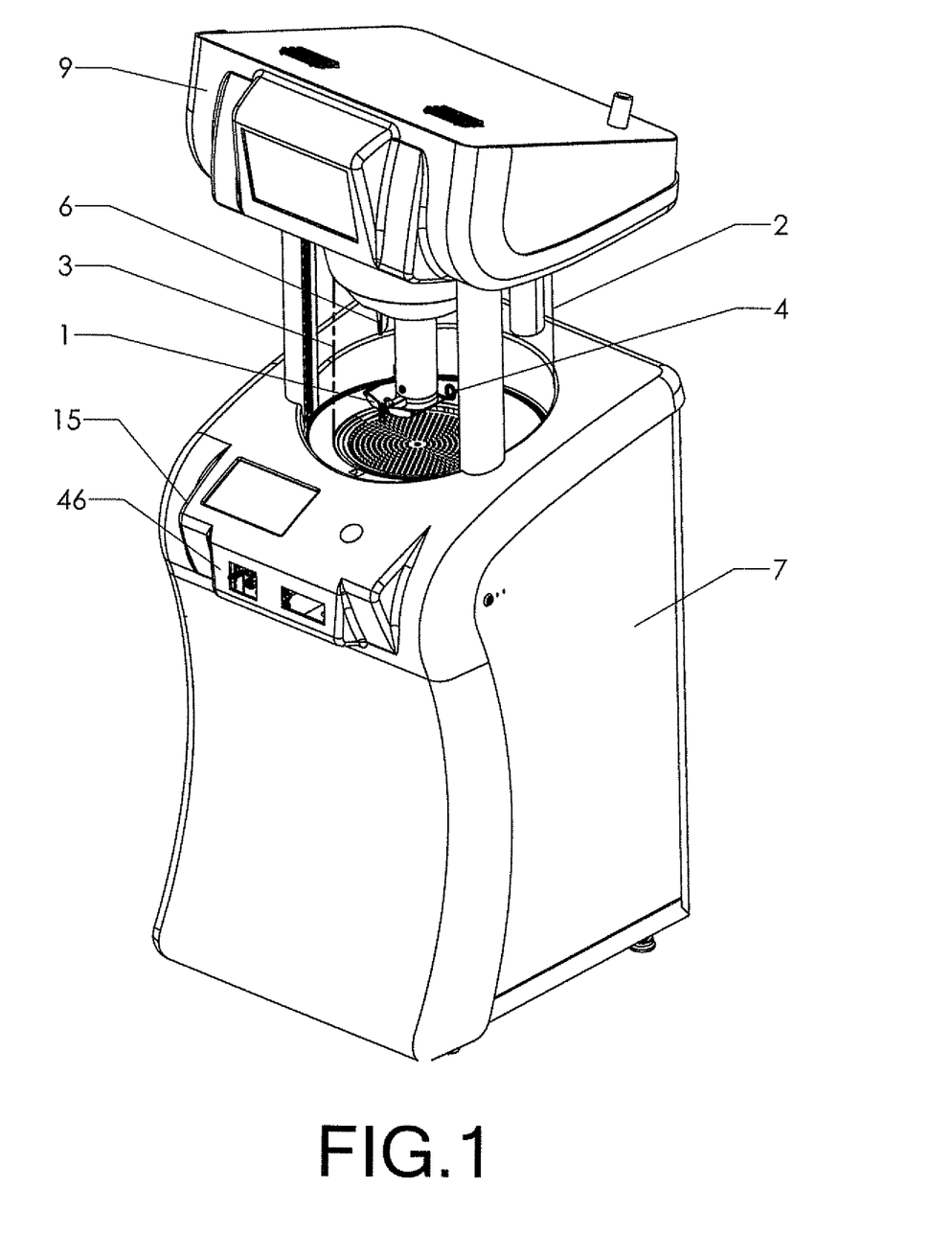
FIG. 1 is a perspective view of the exterior of the machine.
Figure 2:
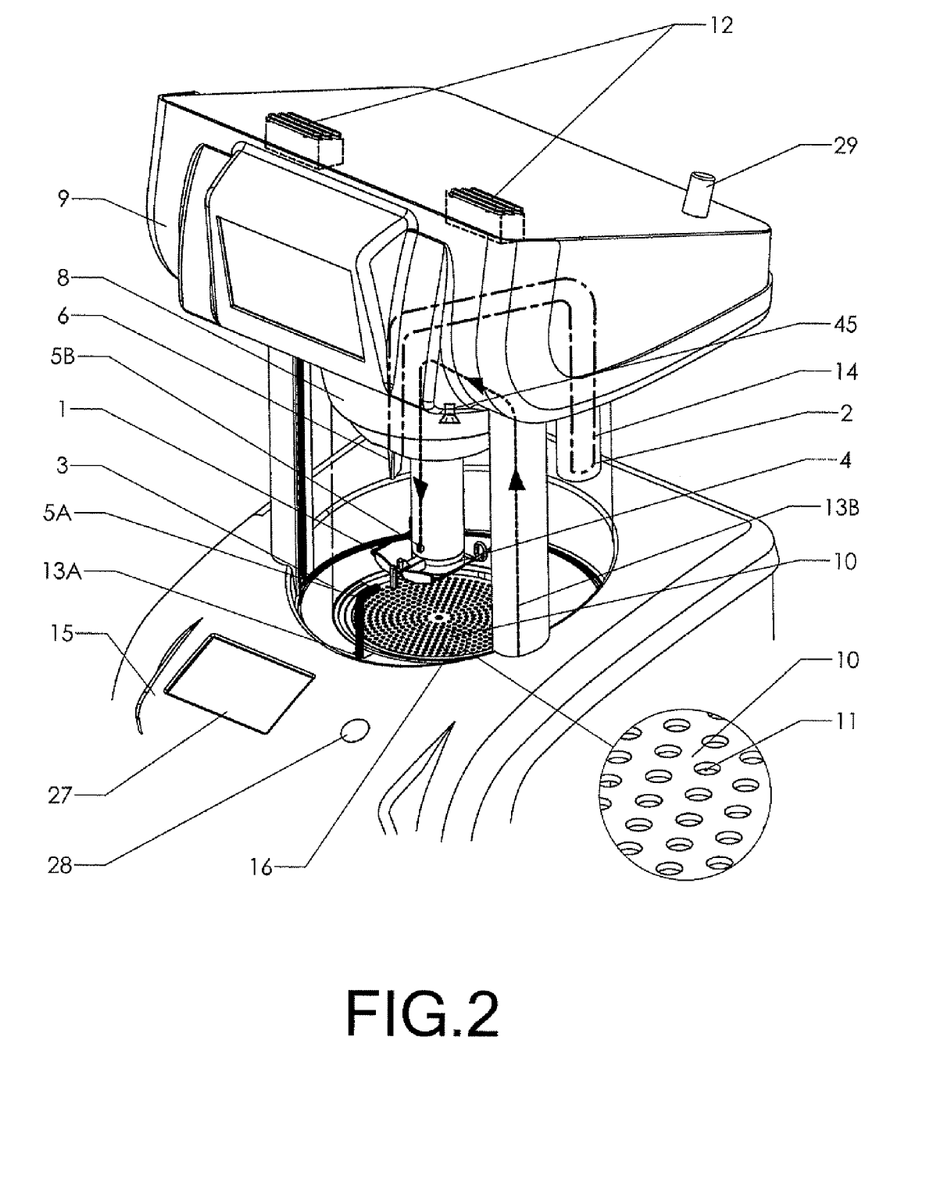
FIG. 2 is an isolated view of the interior of the display cabinet and the upper portion of the operations panel.

Referring now to the drawings, wherein referenced characters designate like or corresponding parts throughout the several views, there is shown in FIG. 1, an exemplary embodiment of the machine. Eyewear 1 in FIGS. 1 and 2 is shown for illustrative purposes only and is not part of the machine. The hollow display cabinet 2 of the machine is made of a durable, transparent material and is of sufficient size in order to accommodate the cylindrical wash chamber 3, the support bracket 4, tubing 13A, 13B, piping 14, nozzles 5A, 5B, and a diffuser 6, respectively, as shown in FIG. 2. Further, the display cabinet 2, the cylindrical wash chamber 3 must be sufficiently sized so that when the display cabinet 2 and the cylindrical wash chamber 3 are open, the user of the machine is able to insert his hands inside the display cabinet 2 and cylindrical wash chamber 3 and attach eyewear 1 to the support bracket 4. In this embodiment, the display cabinet 2 is cylindrical in shape with a sliding front door (not shown) and includes a safety mechanism such that the machine's washing and cleaning operations are incapable of functioning unless the display cabinet is closed. Another safety mechanism is employed to prevent the premature closing of the cylindrical wash chamber 3 before a user removes his hands from the machine. The display cabinet 2 is supported by the control cabinet 7.

The cylindrical wash chamber 3 when closed and, as shown in FIG. 2 seals to an inverted dome 8 located on the ceiling of the display cabinet 2. In this embodiment, the cylindrical wash chamber has an approximate diameter of 12 inches. To open the cylindrical wash chamber 3, the chamber 3 is lowered vertically downward within the control cabinet 7. When in motion, the chamber 3 is in contact with a gasket 16 to remove wash fluid droplets that adhere to its interior surface. To close the chamber 3, it is raised a set distance until it creates a water tight seal with the inverted dome 8.

Figure 3:
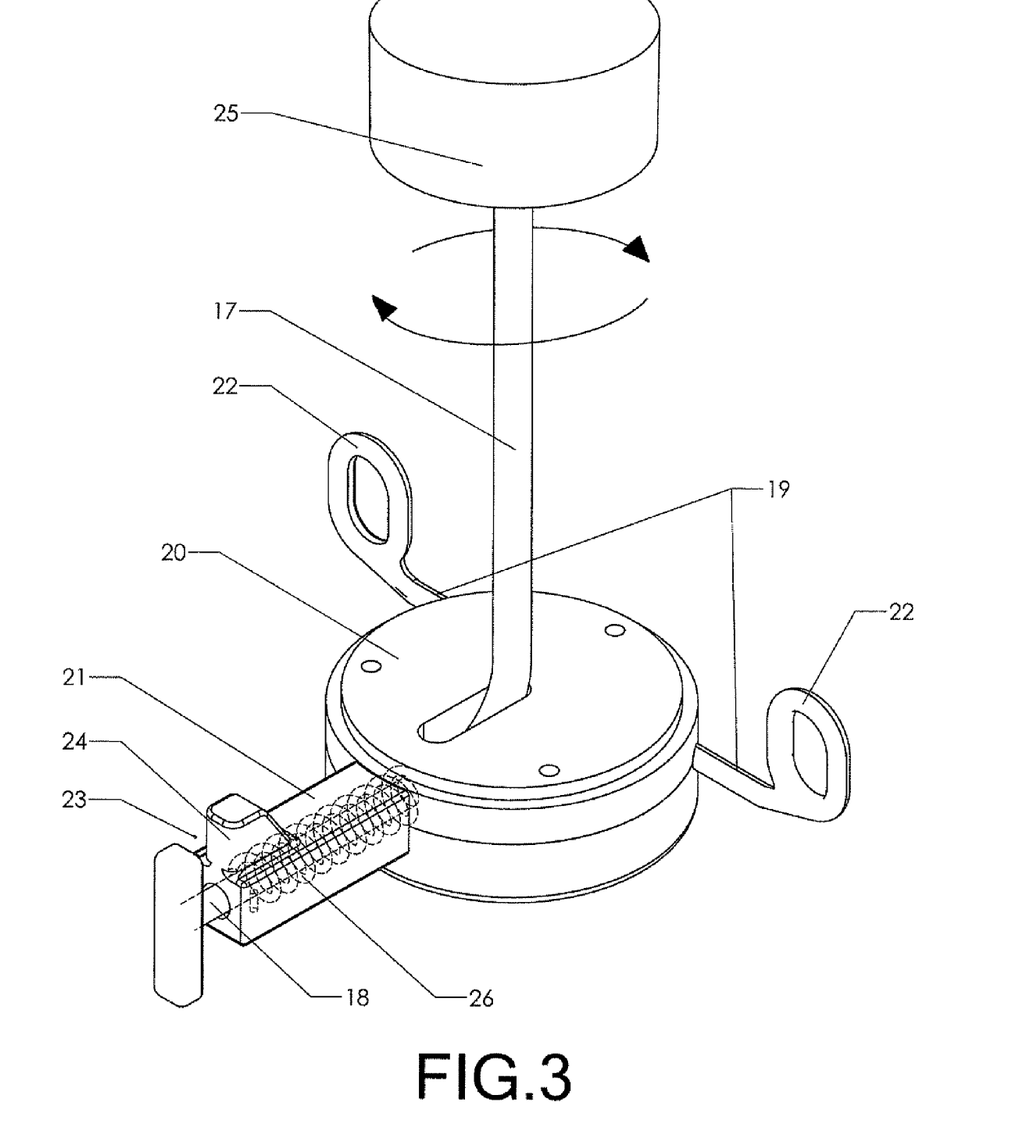
FIG. 3 is an isolated view of the support bracket.

Mounted near the center of the display cabinet 2 and the chamber 3 when closed there is a support bracket 4, which, as shown in FIGS. 2 and 3, is attached to gear assembly 25 located in the top 9 of the display cabinet 2. As shown in FIG. 3, the support bracket 4 comprises a stem 17, two linear bars 19, which are opposite one another and emanating from the rear edge of a disc 20, a bracket bar 21, which protrudes from the front of the disc 20 perpendicular to the linear bars 19, and a nose bridge holding assembly 18 attached to the end of the bracket bar 21 that is opposite the stem 17. In this embodiment, the stem 17 is cylindrical in shape and has a length of approximately 12 inches and a diameter of approximately 0.5 inches. The stem 17 connects to a gear assembly 25 located in the top 9 that enables the support bracket 4 to rotate from side to side. The linear bars 19 can be cylindrical in shape with an approximate diameter of 0.5 inches and each have a length of approximately four inches. Further, the linear bars 19 each have, extending vertically at their outermost end, a loop 22 of adequate size to allow the arms of standard eyewear 1 to pass through each loop 22 when being secured into the support bracket 4 as shown in FIG. 2. The bracket bar 21 is also rectangular in shape with an approximate length of three inches. Contained within the bracket bar 21 is a resilient member (e.g., spring 26) connected to the disc 20 and the nose bridge holding assembly 18. Attached at the end of the bracket bar 21, which is opposite the end attached at the disc 20, is the nose bridge holding assembly 18, which further comprises a vertically-aligned cradle or notch 23, with a fastener 24 molded into the cradle 23, which secures the eyewear 1 during operation of the machine. In this embodiment the fastener 24 is metal with a polyethylene cover.

The support bracket 4 for the eyewear 1 is capable of accommodating eyewear 1 of varying sizes and shapes. The cradle 23 and the fastener 24, with a polyethylene cover further provide a slip resistant surface for the eyewear 1. Further, as shown in FIG. 3, the tensile strength of the spring connecting the holding assembly 18 and the disk 20 is calibrated to snugly clamp the nose bridge of the eyewear 1. The slip resistance and secure hold of the support bracket 4 elements are necessary so that the eyewear 1 remains stationary throughout the washing and drying cycles and through the various movements created by the gear assembly 25. The loops 22 of the support bracket 4 and the disk 20 are sized to fit the stems of eyewear 1 of varying styles and leave the eyewear 1 in an open position. The support bracket 4 firmly supports the eyewear 1, and because the eyewear 1 is maintained in an open position the support bracket provides the greatest available surface area for wash fluid 39 contact and cleaning purposes.

As shown in FIGS. 1 and 2, the bottom center of the display cabinet 2 includes a drain 10 with a diameter approximately the same as the cylindrical wash chamber 3. The drain is underlain by a fabric filter 11. The top 9 is also equipped with two vent fans 12 and an antenna 29 for receiving and transmitting information. An operations panel 15 is situated in front of the display cabinet 2 and includes a touch screen 27 and a trackball 28 so the user can operate the machine. The operations panel 15 also includes a payment center 46 where the user can choose his method of payment. In the exemplary embodiment the payment center 46 allows the user to pay using cash, credit or debit card, or through an electronic transaction (e.g., smart phone application with code retrieval and input). The operations panel 15 is operatively connected to the computerized controller 42.

Figure 4:
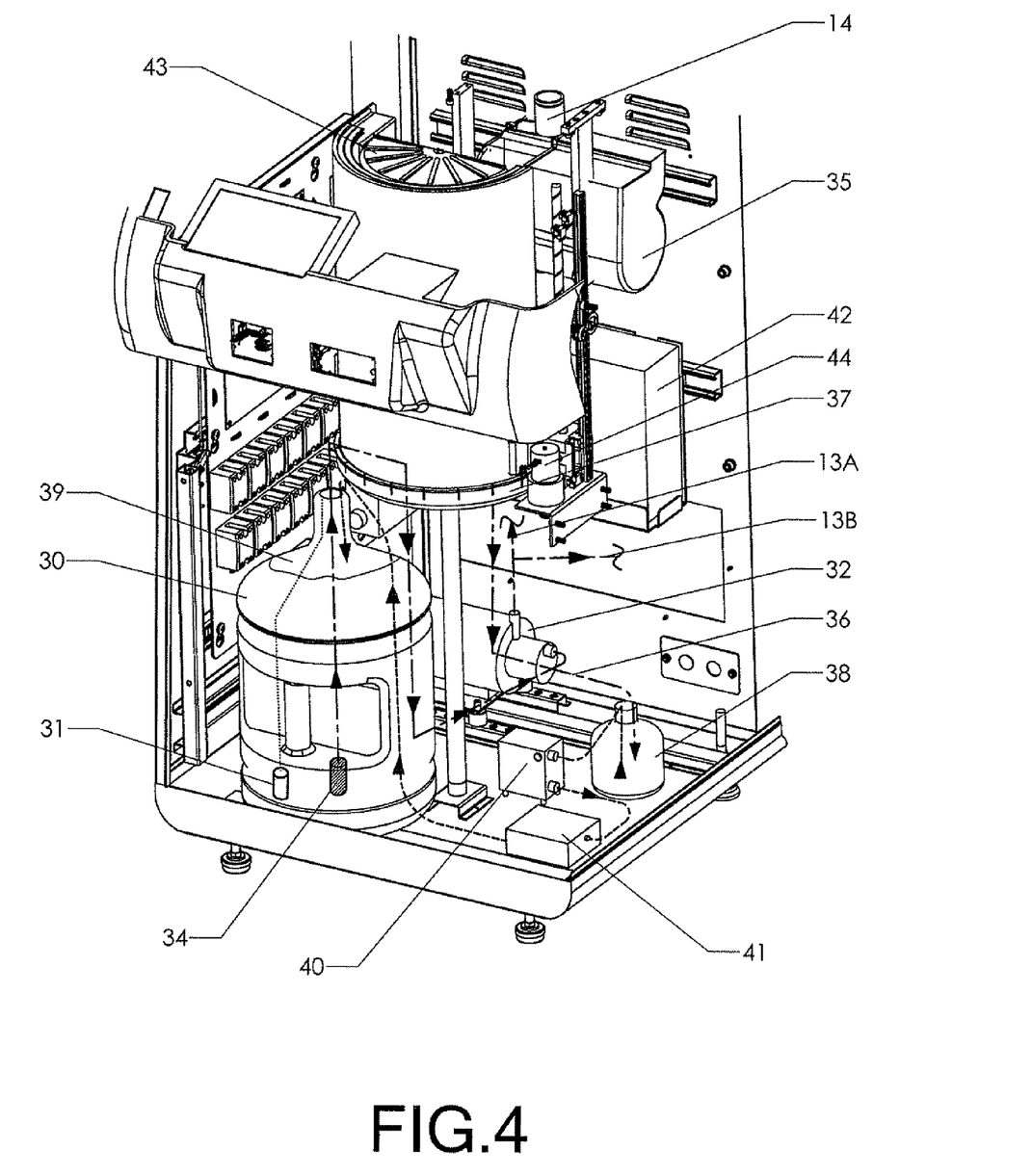
FIG. 4 is an interior view of the machine's base cabinet and its components.

Referring to FIG. 4, the wash fluid reservoir 30 is made of a durable, non-corrosive material and is located at the bottom in the interior of the base cabinet 12. The weight of the wash fluid 39 stored in the wash fluid reservoir 30, will further aid in stabilizing the machine. A wash fluid quality detector 31 will be placed the wash fluid reservoir 30, as shown in FIG. 4. In exemplary embodiments of the invention, the wash fluid reservoir 30 has a 5-gallon capacity and is a standard water bottle. Further the wash fluid quality detector measures total dissolved solid in the wash fluid 39. The preferred wash fluid 39 is water filtered through reverse osmosis or other filtration methods.

The use of water filtered with reverse osmosis as the wash fluid 39 has distinct advantages over other options considered and used by others. First, because the wash fluid 39 is water, there will not be a need for special handling, management of materials, or concerns over leakage. This would be the case if other solvents were used. Second, reverse osmosis water normally has a pH which is slightly less than normal (pH of 7). Therefore, the use of reverse osmosis water as a wash fluid helps to dissolve solids which are adhering to the eyewear 1. Third, because of its lower mineral content, reverse osmosis water will prevent spotting on the eyewear 1. A final advantage of the reverse osmosis water over other types of wash fluids is the ability to regenerate and reuse the wash fluid 39 once it is determined to be ineffective. The ability to reuse a large percentage of wash fluid 39 greatly increases the cost efficiency of the machine. Also, the ability to use common water filtration devices to filter and recycle used wash fluid 39 allows for greater operating times between wash fluid change outs.

As shown in FIG. 4, a pump 32 is mounted inside the base cabinet 12. A suction hose is attached at one end to the pump 32 and extends from the pump 32 into the wash fluid reservoir 30 near its base. The end of the suction hose has an in-line filter 34 attached to it. When the machine is operating during the washing cycle, the pump 32 will draw wash fluid 39 from the wash fluid reservoir 26, through the in-line filter 30 and through the suction hose. The wash fluid 39 is then conveyed from the pump 32 through tubing 13A, 13B, which are connected at the pump 32 outlet. A blower 35 is mounted in the base cabinet. As shown in FIGS. 2 and 4, the tubing 13A, 13B and piping 14 extend up from the pump 32 and the blower 35, respectively, through the base cabinet 12 and into the display cabinet 2. As shown in FIG. 2, tubing 13A and 13B extend and connect to nozzles 5A and 5B to a point approximately 3 inches in front and behind of nose bridge holding assembly 18 when the cylindrical wash chamber 3 is closed. The center of the diffuser 6 will be aligned horizontally with the nose bridge holding assembly 18 and situated approximately 5 inches above the eyewear 1 when attached to support bracket 4. In this embodiment, the pump 32 has an operating pressure range of at least 200 to no greater than 1,000 pounds per square inch (psi). The preferred application pressure is at least 250 psi and no more than 300 psi.

Referring to FIG. 4, there is an accordion drain line 36 that is attached to the catch-pan 37 that supports the cylindrical wash chamber. Used wash fluid 39 collects in the catch-pan 37 following the washing cycle and drains through the accordion drain line 36 into a collector 38. A transfer pump 40 pumps used wash fluid 39 through a filter series 41 and returns the wash fluid to the reservoir 30. In exemplary embodiments, the filter series 41 comprises an ultraviolet light filter followed by a carbon filter, and the collector 38 has a capacity of one-half gallon. Other filtration methods may include reverse osmosis or ion exchange and can be considered in series or in isolation depending on the filtration demand.

As shown in FIGS. 1, 2 and 3, the exterior of the operations panel 15 includes a trackball 28, which controls the gear assembly 25, and a touch screen 27 to allow the user to interact with the computerized controller 42. The machine also includes one or more audio speakers 45 which allow for audio communication with the user depending on the machine status. In automatic mode, the computerized controller 42, which, as shown in FIG. 4, is mounted in the base cabinet 12, will activate the gear assembly 25 causing the support bracket 4 to rotate side-to-side. As shown in FIG. 3, this rotation will deflect the loops 22 approximately one inch in each direction from the support bracket's 4 starting position during both the wash cycle and drying cycle. This will allow for all parts of standard eyewear 1 respectively to be fully exposed to the nozzles 5A and 5B, and the diffuser 6 during the washing cycle and drying cycle, respectively. When the machine is being operated in manual mode, the user can activate the gear assembly 25 and cause the support bracket 4 to rotate by moving the trackball 28. Alternatively, the trackball 28, as well as the touch screen 27 can be eliminated in which case the machine would always function in automatic mode. Instead of the touch screen 27, a touchpad may be used.

Other input devices, such as a joystick, a directional keypad, etc. may also be used in addition to or instead of the trackball 28. According to the present example, when the machine is being operated in manual mode, the trackball 28 is both durable and the requires limited motion to be affected, and has been found by the inventor to be more appealing to young children who use the machine.

Further, the computerized controller 42 activates a sliding motor 43, as shown in FIG. 4 that will rotate the display cabinet 2 to an open position allowing the user to secure the eyewear 1 to the support bracket 4. Once the eyewear is secured and hands are cleared from the machine, the computerized controller 42 activates a lift motor 44 that will raise the cylindrical wash chamber 3 to a closed position. The computerized controller 42 also activates sliding motor 43 to close the display cabinet 2. The computerized controller 42 will then initiate the wash cycle by activating the pump 32 for a preset time period and then initiate the drying cycle by activating the blower 35, which operates for a preset time period. Near the conclusion of the machine's drying cycle, the computerized controller 42 activates the two vent fans 12 which will operate for a preset period to evacuate residual moisture in the cylindrical wash chamber 3. The computerized controller 42 completes the process by opening the cylindrical wash chamber 3 with the lift motor 44 and the display cabinet 2 with the sliding motor 43 to allow the user to remove his eyewear 1 from the support bracket 4.

The computerized controller 42 is also capable of transmitting data and messages communicating wirelessly via the antenna 29. The computerized controller 42 will perform system diagnostics periodically to ensure the machine is in service. Because it is anticipated that machines will be located at various locations of greatest need, communications with a central operator or technician is necessary to ensure timely maintenance. The technology for the exchange of operational status information via wireless communication or wireline has been previously disclosed in applications such as US2010/0268792 and is incorporated herein by reference. These systems may be integrated or utilized wholly or partially in various embodiments to maintain communications amongst the machines in service and the operator or technician.

Figure 5A:
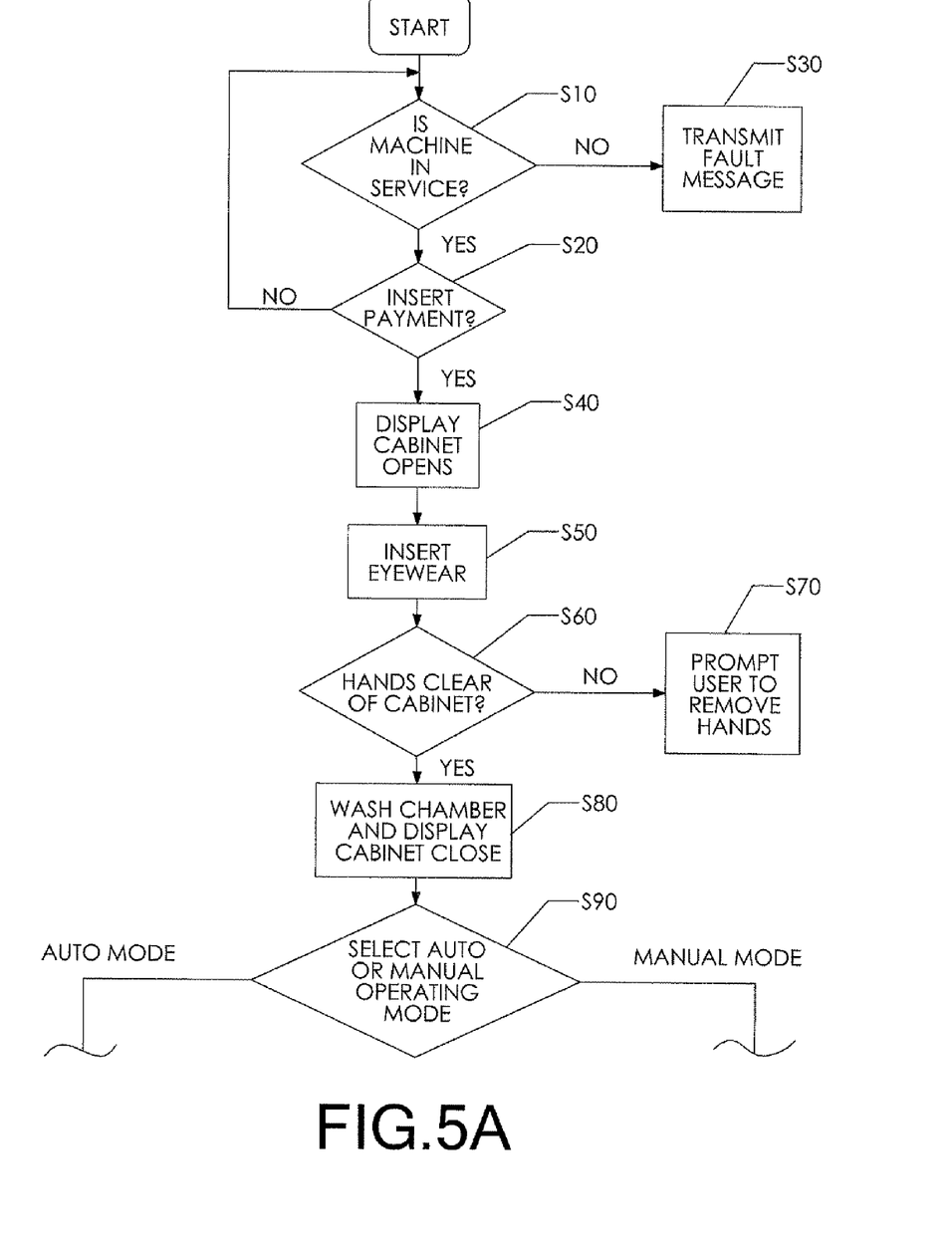
FIGS. 5A & 5B are a process flow algorithm for the machine when in operation.
Figure 5B:
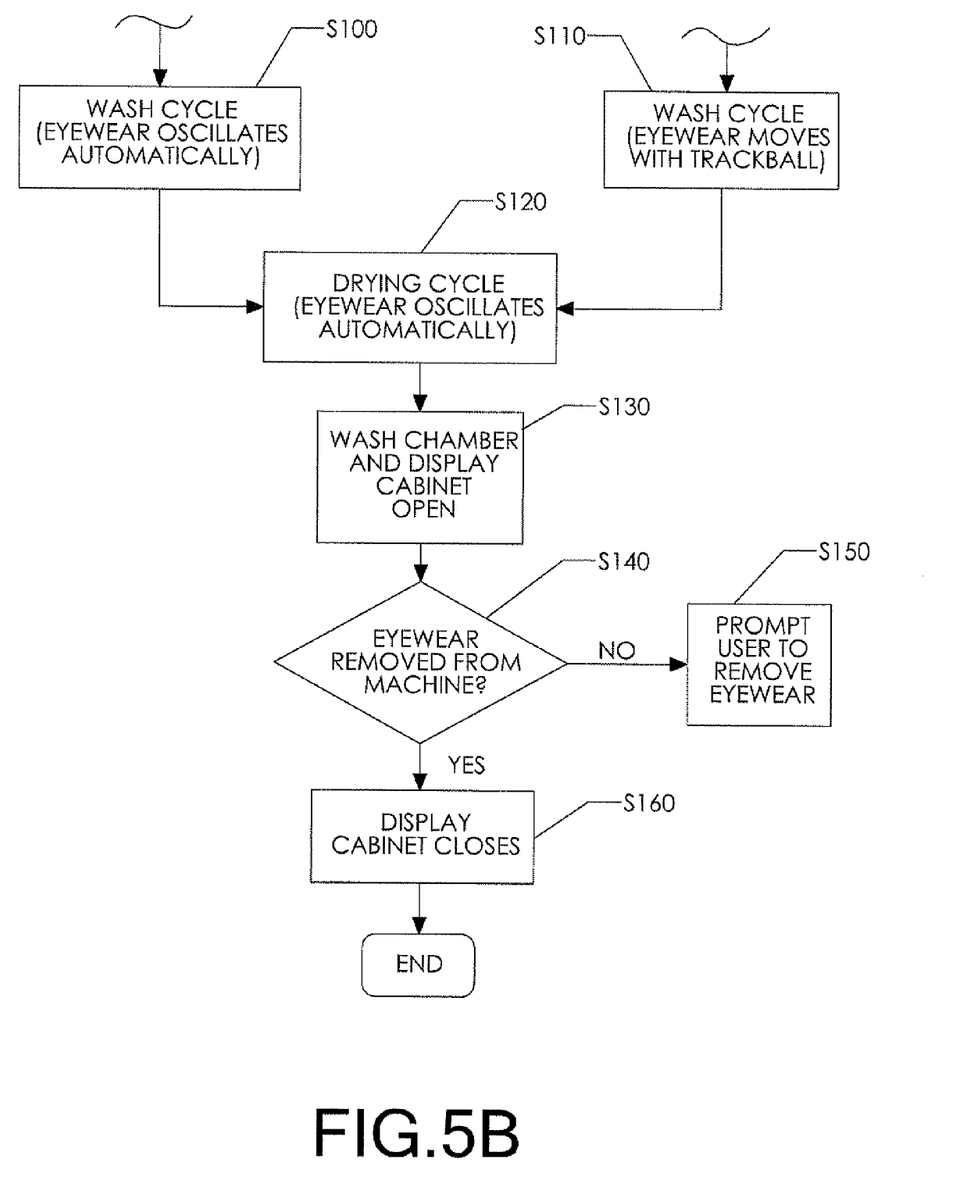

Next, the eyewear washing method is described with reference to FIGS. 5A & 5B. The method is executed by the computerized controller 42 by executing a program stored thereon when the machine is turned on. First, as shown in FIG. 5A, the computerized controller will determine whether or not the machine is in service (Step S10). If there is a fault in the machine (Step S10: No) the computerized controller 42 transmits an appropriate fault message (Step S30) to an operator or technician. If the machine is in service (Step S10: Yes), the machine prompts the user to insert payment (Step S20). If payment is not received (Step S20: No), the machine returns to ready mode (Step S10). If payment is received (Step S20: Yes), the display cabinet 2 opens (Step S40) and the user inserts his eyewear 1 into the support bracket 4 (Step S50).

If the user's hands or other objects remain in the machine (Step S60: No), the user is prompted via the speakers 45 and the touch screen 27 to remove hands or articles from the machine (Step S70). Once the user's hands are removed from the display cabinet 2 (Step S60: Yes), the cylindrical wash chamber 3 and the display cabinet 2 will close (Step S80). Referring to FIGS. 5A & 5B, the user selects either an automatic or manual mode of operation (Step S90). In the automatic mode (Step S100)(Step S90: Auto), the computerized controller 42 will oscillate the support bracket 4 and the eyewear 1 throughout as wash fluid 39 is sprayed onto the eyewear for a preset time period. If the manual mode (Step S110)(Step S90: Manual), the user guides the support bracket 4 with the trackball 28 to allow wash fluid 39 to come in contact with selected parts of the eyewear 1 over a preset time period.

The drying cycle (Step S120) follows the wash cycle. The computerized controller 42 automatically oscillates the support bracket 4 and the eyewear 1 and operates the blower 35 for a preset time period. The computerized controller turns off the blower and activates the two vent fans 12 which again operate for a preset period to complete the drying cycle (Step S120). After the drying cycle the cylindrical wash chamber 3 and the display cabinet 2 open (Step S130). The user removes the eyewear 1 from the machine (Step S140: Yes). If the user fails to remove his glasses (Step S140: No), the user is prompted via the speakers 45 and the touch screen 27 to remove hands and eyewear (Step S150). Once the user retrieves his eyewear the display cabinet 2 closes (Step S160). The computerized controller will determine if the machine remains in service. (Step S10) and the process is repeated.

The machine and accompanying method described in the embodiments above provide an improvement over the related art because the machine is be readily available at locations of greatest need. Further, the machine and method are simple to use and allow the user the option to isolate wash fluid on the dirtiest part of the eyewear. The machine includes a display cabinet, cylindrical wash chamber, operations panel, and a control cabinet.

While various features have been described in conjunction with the examples outlined above, various alternatives, modifications, variations, and/or improvements of those features and/or examples may be possible. Accordingly, the examples, as set forth above, are intended to be illustrative. Various changes may be made without departing from the broad spirit and scope of the underlying inventive principles.

For example, a version may be presented without the touch screen 27 or the payment center 46. It is conceivable that, depending on the desired machine performance, the filter series 41 could be totally or partially bypassed or that other filtration methods may be employed. Also, because it is not critical to the operation, the display cabinet 2 could remain in the open position while the machine is operating. Therefore, the spirit and scope of the appended claims should not be limited to the description of the preferred versions and operating parameters and process contained herein.

What is claimed is:
1. An eyewear cleaning device, comprising:
a wash chamber;
a support bracket located within the wash chamber, the support bracket being configured to support eyewear within the wash chamber;
at least one nozzle located within the wash chamber and configured to direct wash fluid onto the eyewear when the eyewear is supported by the support bracket;
an input device configured to receive input from a user of the eyewear cleaning device; and
a controller configured to:
receive an input signal from the input device; and
based on the received input signal, change the orientation of the support bracket relative to the at least one nozzle while the nozzle is expelling the wash fluid;
wherein the support bracket comprises:
a support;
two bars protruding in generally opposite directions from the support, each of the two bars comprising a loop disposed at one end of the bar, each of the loops being configured to allow the corresponding arm of the eyewear to pass through the loop when the eyewear is supported by the support bracket; and
a bracket bar oriented generally perpendicular to each of the two bars and configured to support a nosepiece of the eyewear when the eyewear is supported by the support bracket.

2. The eyewear cleaning device of claim 1, wherein:
the input device comprises at least one of: a trackball; a joystick; a directional keypad; a touchpad; and a touch screen;
the input signal received from the input device specifies a change in the orientation of the support bracket; and
based on the received input signal, the orientation of the support bracket is changed relative to the at least on nozzle according to the specified change in orientation, while the nozzle is expelling the wash fluid.

3. The eyewear cleaning device of claim 1, wherein the bracket bar further comprises:
a nose bridge holding assembly; and
a resilient member, the resilient member being connected to the nose bridge holding assembly and the support, the resilient member configured to apply sufficient force to the eyewear to secure the eyewear on the support bracket against a force of the wash fluid when the eyewear cleaning device is in operation.

4. The eyewear cleaning device of claim 1, wherein the bracket bar is about 3 inches long.

5. The eyewear cleaning device of claim 1, wherein each of the two bars is about 4 inches long.

6. The eyewear cleaning device of claim 1, further comprising:
an internal space configured to accept a fluid reservoir for holding the wash fluid; and
a filter system configured to filter the wash fluid.

7. The eyewear cleaning device of claim 6, wherein the filter system comprises a reverse osmosis filter.

8. The eyewear cleaning device of claim 6, further comprising:
the fluid reservoir configured to hold the wash fluid.

9. The eyewear cleaning device of claim 8, further comprising:
a drain disposed below the support bracket and configured to collect used wash fluid, the used wash fluid being wash fluid that has exited the at least one nozzle.

10. The eyewear cleaning device of claim 9, further comprising:
a wash fluid conveyance system configured to:
transport wash fluid from the fluid reservoir to the at least one nozzle;
transport the collected used wash fluid from the drain to the filter system; and transport filtered wash fluid from the filter system to the fluid reservoir.

11. The eyewear cleaning device of claim 10, wherein the fluid conveyance system comprises a pump configured to deliver the wash fluid to each of the at least one nozzles in a pressure range between 200 and 1000 psi.

12. The eyewear cleaning device of claim 1, further comprising:
a payment center configured to accept at least one of cash or electronic payment;
wherein the controller is configured to:
receive a signal from the payment center indicating that the payment has been accepted;
cause a door of the wash chamber to open;
cause a door of the wash chamber to close;
control a wash fluid conveyance system to supply the wash fluid to the at least one nozzle; and
change the orientation of the support bracket relative to the at least one nozzle in response to the received input signal while the wash fluid conveyance system is supplying the wash fluid to the at least one nozzle.

13. The eyewear cleaning device of claim 1, wherein:
the received input signal indicates a selection of an automatic mode; and
in response to the selection of the automatic mode, the controller changes the orientation of the support bracket by automatically causing the support bracket to oscillate relative to the at least one nozzle.

14. The eyewear cleaning device of claim 1, wherein the at least one nozzle comprises a first and a second nozzle, the first nozzle configured to direct fluid at a front surface of the eyewear when the eyewear is supported by the support bracket, the second nozzle configured to direct fluid at a rear surface of the eyewear when the eyewear is supported by the support bracket.

15. The eyewear cleaning device of claim 1, further comprising:
a diffuser configured to dry the eyewear when the eyewear is supported by the support bracket; and
an exhaust configured to exhaust residual moisture from the wash chamber.

16. The eyewear cleaning device of claim 1, wherein, based on the received input signal, the support bracket is rotated to change the orientation of the support bracket relative to the at least one nozzle.

17. A method for operating an eyewear cleaning device, comprising:
supporting eyewear within a wash chamber on a support bracket, the support bracket being configured to support eyewear within the wash chamber;
directing wash fluid onto the eyewear with at least one nozzle located within the wash chamber when the eyewear is supported by the supporting bracket;
receiving an input signal from an input device that is manipulated by a user of the eyewear cleaning device, the input signal indicating a change in the orientation of the support bracket; and
based on the input signal, changing the orientation of the support means relative to the at least one nozzle based on the received input signal while nozzle is expelling wash fluid;
wherein the support bracket comprises:
a support;
two bars protruding in generally opposite directions from the support, each of the two bars comprising a loop disposed at one end of the bar, each of the loops being configured to allow the corresponding arm of the eyewear to pass through the loop when the eyewear is supported by the support bracket; and
a bracket bar oriented generally perpendicular to each of the two bars and configured to support a nosepiece of the eyewear when the eyewear is supported by the support bracket.

18. The method for operating an eyewear cleaning device of claim 17, wherein, based on the received input signal, the support bracket is rotated to change the orientation of the support bracket relative to the at least one nozzle.

19. An eyewear cleaning device comprising:
supporting means for supporting eyewear within a wash chamber, the support means being configured to support eyewear within the wash chamber;
means for directing wash fluid onto the eyewear when the eyewear is supported by the supporting means;
means for receiving an input signal from an input device that is manipulated by a user of the eyewear cleaning device, the input signal indicating a change in the orientation of the support means; and
means for changing, based on the input signal, the orientation of the support means relative to the means for directing wash fluid based on the received input signal while means for directing wash fluid is expelling wash fluid;
wherein the support means comprises:
a support;
two bars protruding in generally opposite directions from the support, each of the two bars comprising a loop disposed at one end of the bar, each of the loops being configured to allow the corresponding arm of the eyewear to pass through the loop when the eyewear is supported by the support means; and
a bracket bar oriented generally perpendicular to each of the two bars and configured to support a nosepiece of the eyewear when the eyewear is supported by the support means.

20. The eyewear cleaning device of claim 19, wherein:
the means for receiving the input signal comprises at least one of: a trackball; a joystick; a directional keypad; a touchpad; and a touch screen;
the received input signal specifies a change in the orientation of the support means; and
based on the received input signal, the orientation of the support means is changed relative to the means for directing wash fluid onto the eyewear according to the specified change in orientation, while the means for directing wash fluid onto the eyewear is expelling the wash fluid.

21. The eyewear cleaning device of claim 19, wherein, based on the received input signal, the support means is rotated to change the orientation of the support means relative to the means for directing wash fluid onto the eyewear.

* * * * *